United States Patent
Meunier (10) Patent No.: US 8,427,903 B2
(45) Date of Patent: Apr. 23, 2013

(54) METHOD FOR MONITORING A SUBSOIL ZONE USING A PLURALITY OF CORRELATED TRACES, PARTICULARLY DURING SIMULATED FRACTURING OPERATIONS

(75) Inventor: Julien Meunier, Massey Cedex (FR)

(73) Assignee: CGGVeritas Services SA, Massy Cedex (FR)

( * ) Notice: Subject to any disclaimer, the term of this patent is extended or adjusted under 35 U.S.C. 154(b) by 0 days.

(21) Appl. No.: 13/322,675

(22) PCT Filed: May 27, 2010

(86) PCT No.: PCT/EP2010/057316
§ 371 (c)(1),
(2), (4) Date: Nov. 28, 2011

(87) PCT Pub. No.: WO2010/136523
PCT Pub. Date: Dec. 2, 2010

(65) Prior Publication Data
US 2012/0069707 A1    Mar. 22, 2012

(30) Foreign Application Priority Data
May 27, 2009 (FR) .................................. 09 53487

(51) Int. Cl.
G01V 1/00 (2006.01)
G01V 1/38 (2006.01)
(52) U.S. Cl.
USPC .................................. 367/38; 367/13; 367/73
(58) Field of Classification Search .................... 367/38, 367/13, 73
See application file for complete search history.

(56) References Cited

U.S. PATENT DOCUMENTS

| 5,463,594 | A | 10/1995 | Lindsey et al. |
| 5,508,914 | A * | 4/1996 | Lee ................................... 702/14 |
| 5,757,723 | A * | 5/1998 | Weglein et al. .................. 367/38 |
| 7,391,675 | B2 | 6/2008 | Drew |
| 2002/0151793 | A1* | 10/2002 | Geiser et al. ................... 600/450 |
| 2004/0196739 | A1* | 10/2004 | Daube et al. .................... 367/53 |
| 2005/0122840 | A1* | 6/2005 | Haldorsen ........................ 367/57 |
| 2006/0018192 | A1* | 1/2006 | Jeffryes et al. .................. 367/41 |

(Continued)

FOREIGN PATENT DOCUMENTS
FR 2869693 A1 11/2005
WO 2008/033797 A2 3/2008

OTHER PUBLICATIONS

International Search Report for PCT/EP2010/057316. 6 pages.*
Hirokazu, Moriya et al., "Precise Source Location of AE Doublets by Spectral Matrix Analysis of Triaxial Hodogram", Mar. 30, 1992; revised Apr. 7, 1993; Geophysics, 1994 Society of Exploration Geophysicists.
French Preliminary Report issued in FR 0953487 and dated Apr. 14, 2010.
International Search Report issued in Application No. PCT/EP2010/057316 and mailed on Nov. 16, 2011.

Primary Examiner — Isam Alsomiri
Assistant Examiner — James Hulka
(74) Attorney, Agent, or Firm — Potomac Patent Group PLLC (57) ABSTRACT

The invention relates to a method for monitoring a subsoil zone, wherein a plurality of receivers are arranged on a surface of the soil or near said surface, straight above a geological zone to be monitored, comprising the following steps: generating a set of reference seismic data recording seismic data by means of said receivers; correlating the seismic data recorded (52) with the reference seismic data; comparing each trace of the correlated data, with correlated traces located in a vicinity of said trace, in order to evaluate a similarity of each correlated trace with the adjacent correlated traces, detecting a microseismic event occurring in the subsoil zone by analysing said similarity. This method enables real-time monitoring.

20 Claims, 7 Drawing Sheets

U.S. PATENT DOCUMENTS

| | | |
|---|---|---|
| 2006/0164916 A1* | 7/2006 | Krohn et al. .................... 367/41 |
| 2006/0203614 A1 | 9/2006 | Harmon |
| 2006/0217890 A1* | 9/2006 | Iranpour et al. ................ 702/14 |
| 2006/0285438 A1 | 12/2006 | Arrowsmith et al. |
| 2008/0008040 A1* | 1/2008 | Laycock ......................... 367/76 |
| 2008/0123469 A1 | 5/2008 | Wibaux et al. |
| 2010/0302905 A1* | 12/2010 | Meunier ......................... 367/42 |

* cited by examiner

Calibration Shot

FIG. 4

Flattened Calibration Shot

FIG. 7
Micro earth quake

FIG. 8
Micro earth quake correlated by reference shot

METHOD FOR MONITORING A SUBSOIL ZONE USING A PLURALITY OF CORRELATED TRACES, PARTICULARLY DURING SIMULATED FRACTURING OPERATIONS

FIELD OF THE INVENTION

The invention relates to a method for monitoring a subsoil zone by detecting microseismic events.

The invention relates more specifically to a method for monitoring stimulated fracturing performed in a well.

STATE OF THE RELATED ART

Stimulated fracturing operations are intended to increase the productivity of a hydrocarbon reservoir working well.

These operations consist of injecting a high-pressure fluid into a layer of the subsoil where the reservoir is located. The injection of the fluid produces microfractures in the layer. This technique makes it possible to increase the permeability of the reservoir by favouring hydrocarbon circulation via the microfractures to the well.

However, these operations require continuous monitoring of the reservoir so as, on one hand, to monitor the progress of the fracturing operation and, on the other, stop the operations when the fracturing is sufficient.

Known monitoring techniques make use of the fact that the microfractures generated in the layer induce micro-earthquakes which are propagated and can be detected by means of receivers.

Document WO2008/033797 describes a monitoring method wherein the seismic receivers are arranged on the soil surface. The subsoil zone to be monitored in divided into a plurality of cells. An expected travel time between each cell and each receiver is then calculated using a subsoil velocity model. The seismic signals received by the receivers and recorded by the recorder (referred to as "traces") are corrected to account for the differences in expected travel times between one cell and each of the receivers, and the sum calculated. The summed data (referred to as "source" data) are analysed to detect the presence of a possible (or "triggering") event characterised by a large amplitude and high energy parameters.

The monitoring method described in this document does not enable rapid data processing, and is not suitable for real-time subsoil monitoring.

Document U.S. Pat. No. 7,391,675 describes a real-time monitoring wherein the seismic receivers are arranged in a well, which may be either the producing well or another well. The method consists of migrating the seismic data recorded to perform continuous mapping of the subsoil, on the basis of a predictive travel time model of the waves P and S in the subsoil, and detecting a time of a location corresponding to a maximum coalescences associated with the occurrence of an event.

One drawback of this method is that it is necessary to install receivers inside a well, which complicates the installation and increases the cost. In addition, if the receivers are installed in the injection well, the well tends to vibrate under the effect of this injection, which raises the noise level on the receivers positioned in this well. It is not always possible to have access to another well.

Furthermore, the following documents describe the use of a perforation shot to calibrate a velocity model:

SPE 115722, Denver, 21-24 Sep. 2008, "Velocity Calibration for Microseismic Monitoring: Applying Smooth Models With and Without Perforation Timing Measurements", Pei et al., and EAGE Workshop on Passive Seismic, Limasol, 22-25 Mar. 2009, A-13, "Dual Treatment Monitoring with Horizontal Receiver Array", Michaud et al.

DESCRIPTION OF THE INVENTION

One aim of the invention is to propose a monitoring method enabling rapid detection of a microseismic event.

According to a first aspect, the invention envisages a method for monitoring a subsoil zone by means of a plurality of seismic receivers arranged on the soil surface or near said surface, comprising the following steps:
- generating a set of reference seismic data,
- recording seismic data by means of said receivers,
- correlating the seismic data recorded with the reference seismic data,
- comparing each correlated data trace with correlated traces located in a vicinity of said trace, in order to evaluate a similarity of each correlated trace with the adjacent correlated traces,
- detecting a microseismic event occurring in the subsoil zone by analysing said similarity.

The proposed method offers the advantage of enabling real-time processing of the seismic data acquired.

According to another aspect, the invention envisages a method for monitoring a fracturing operation in a well by means of a plurality of seismic receivers arranged about the well on the soil surface or in the vicinity of said surface, comprising the following steps:
- generating a set of reference seismic data following a perforation shot in the well,
- recording the seismic data by means of said receivers,
- correlating the seismic data recorded with the reference seismic data,
- comparing each correlated data trace with correlated traces located in a vicinity of said trace, in order to evaluate a similarity of each correlated trace with the adjacent correlated traces,
- detecting a microseismic event occurring in the subsoil zone by analysing said similarity.

In addition to the fact that it enables real-time processing, the proposed method uses a perforation shot in the well to generate reference seismic data. This offers the advantage of not requiring the use of a velocity model. Indeed, the seismic data acquired following a perforation shot serve somewhat to characterise the subsoil zone and replace the use of the velocity model.

The correlation of the seismic data recorded during the fracturing operation with the reference data produces correlated data showing the presence of a potential microseismic event.

DESCRIPTION OF FIGURES

Other features and advantages will emerge from the description hereinafter, which is purely illustrative and non-limitative, and must be read with reference to the appended figures, wherein.

DETAILED DESCRIPTION OF AN EMBODIMENT

Figure 1:
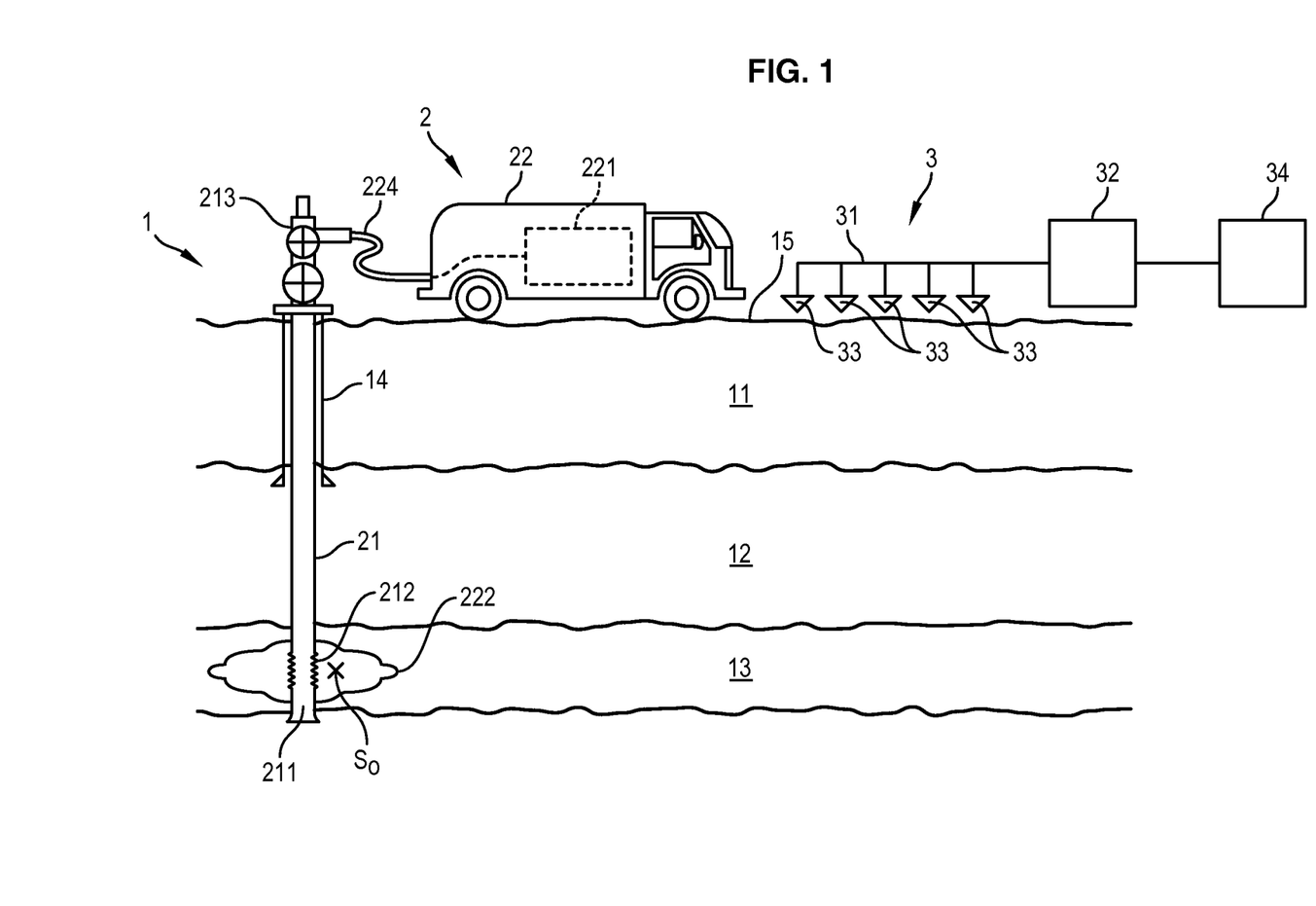
FIG. 1 represents schematically an example of an installation to perform stimulated fracturing operations in a working well.

In FIG. 1, the installation is deployed on a hydrocarbon (gas or oil) production site 1. The site 1 comprises a subsoil zone, comprising geological layers 11, 12, 13. The layer 13 is a layer containing hydrocarbons. The site 1 comprises a well 14 drilled through the geological layers to the layer 13.

The installation also comprises a fracturing device 2 and a monitoring device 3.

The fracturing device 2 comprises a fluid injection column 21 extending into the well 14 and a pumping unit 22 positioned on the surface 15 of the subsoil zone.

The injection column 21 comprises a lower end 211 provided with openings 212 and an upper end 213 equipped with a well head 214 connected to the pumping unit 22.

The pumping unit 22 comprises a pump 221 suitable for injecting a high-pressure fracturing fluid 222 into the layer 13 via the injection column 22. The fracturing fluid typically consists of a mixture of a liquid (water) and particles (sand).

The fracturing fluid is injected via the pump 221 into the column 21 via the well head 214, circulates in the column 21 and is discharged from the column via openings 212 created by well casing perforations. The fracturing fluid enters the subsoil layer 13, inducing fracturing of the layer 13, i.e. the appearance of cracks inside the layer 13. The particles contained in the fracturing fluid are forced into the cracks and remain in place in the cracks when the fluid pressure is released, thus forming a permeable network enabling hydrocarbon to flow in the layer 13 to the well 14.

The monitoring device 3 comprises a network 31 of receivers (geophones), a recording unit 32 and a processing unit 34.

The receiver network 31 comprises a plurality of receivers 33 arranged on the soil surface 15 or in the vicinity of said surface. The receivers 33 may be arranged on the nodes of a grid as in FIG. 9, but may be arranged in any other configuration.

The soil movements detected by the receivers 33 are converted into electric voltages transmitted to the recording unit 32 to be recorded therein. The recordings obtained represent the seismic data (or traces).

The processing means 34 include calculation means programmed to perform the steps of the monitoring method using the seismic data.

The monitoring method is performed in two successive phases:
- a first phase (preparatory phase) consisting of generating the reference data, prior to the stimulated fracturing operation, and
- a second phase (monitoring phase) enabling real-time detection of microseismic events during the stimulated fracturing operation.

Figure 2:
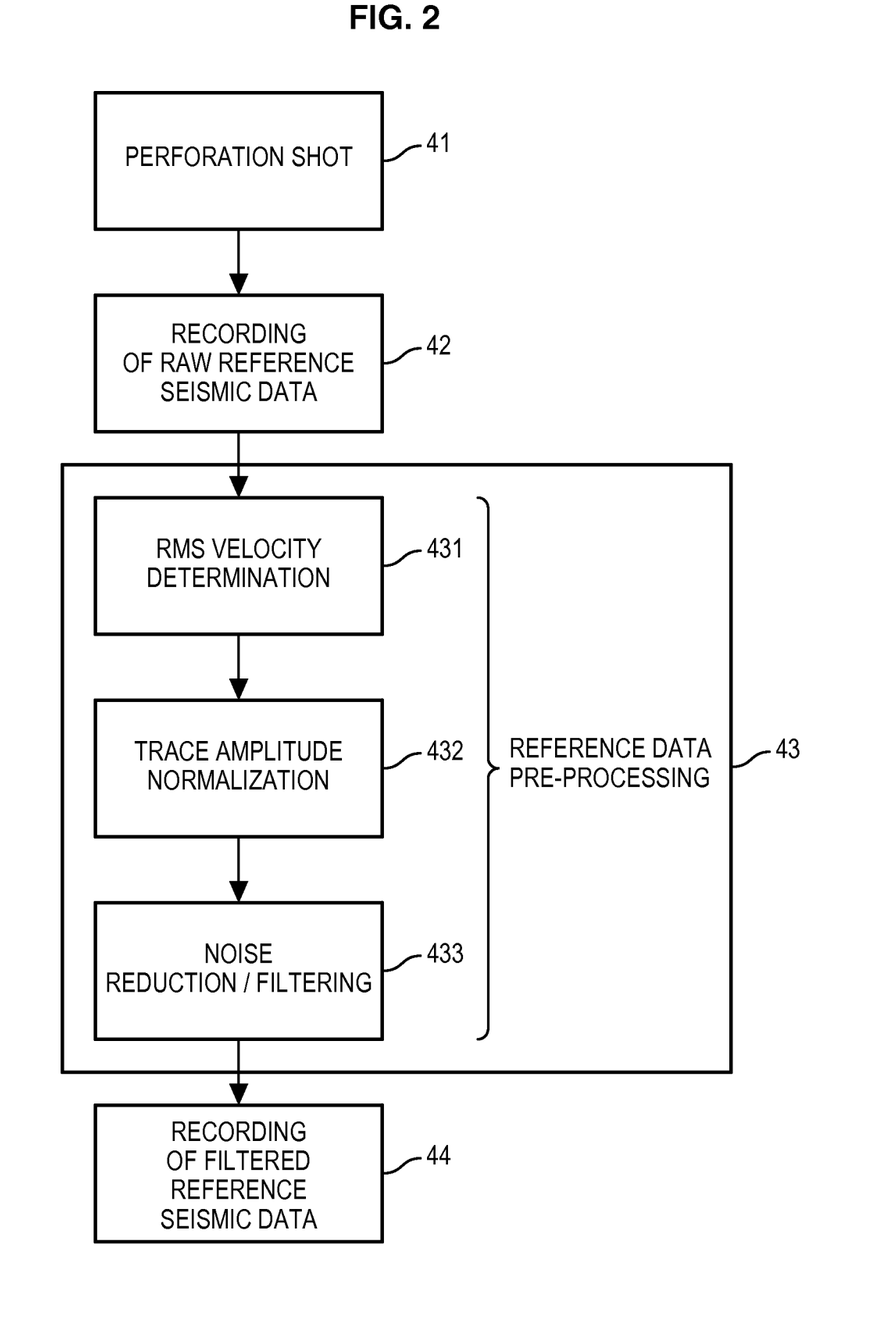
FIG. 2 is a diagram representing schematically the steps of a first phase of the monitoring process, enabling the acquisition of reference data.

FIG. 2 is a diagram representing schematically the step of a possible implementation of the first phase of the monitoring process.

According to a first step 41, a perforation shot performed in the well to create openings 212 is used, as specified above, as a source of seismic waves. Such a source may be characterised as an isotropic point source (explosive source) located at a point $S_0$ (referred to as "perforation point"), in the vicinity of the subsoil zone to be monitored. The coordinates $\{x, y$ and $z\}$ of this source are generally known. Knowledge of the specific time of the explosion is not necessary for the proper operation of the process. The subsoil zone to be monitored is the zone of the layer 13 and surrounding layers where microseismic events will be likely to occur due to the injection of fracturing fluid in the layer 13. At the time of the perforation shot, a seismic wave occurs which is propagated in the layers of the subsoil to the receivers 33.

Figure 3:
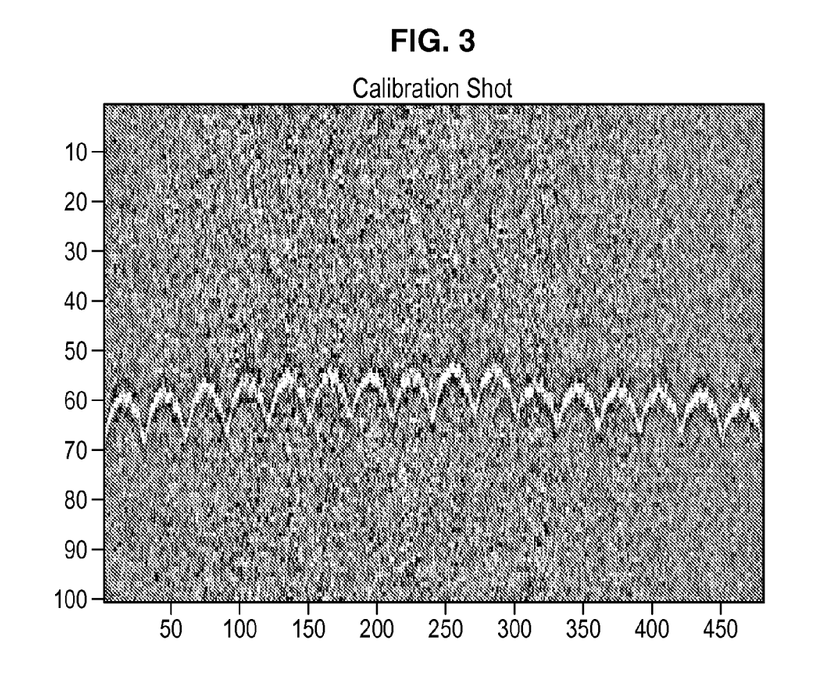
FIG. 3 represents schematically raw reference seismic data, as recorded following a drilling blast.

According to a second step 42, the receivers 33 generate seismic signals or "traces". The set of traces generated by the receivers form raw reference seismic data (data represented in FIG. 3). These raw reference seismic data are recorded in the recording unit 32.

According to a third step 43, the raw reference seismic data are pre-processed by the processing unit 34. This third step 43 comprises several sub-steps 431 to 433 for filtering the raw reference seismic data.

According to a first sub-step 431, the processing unit 34 determines an RMS (Root Mean Square) velocity which maximises the sum of the traces contained in the seismic data.

Figure 4:
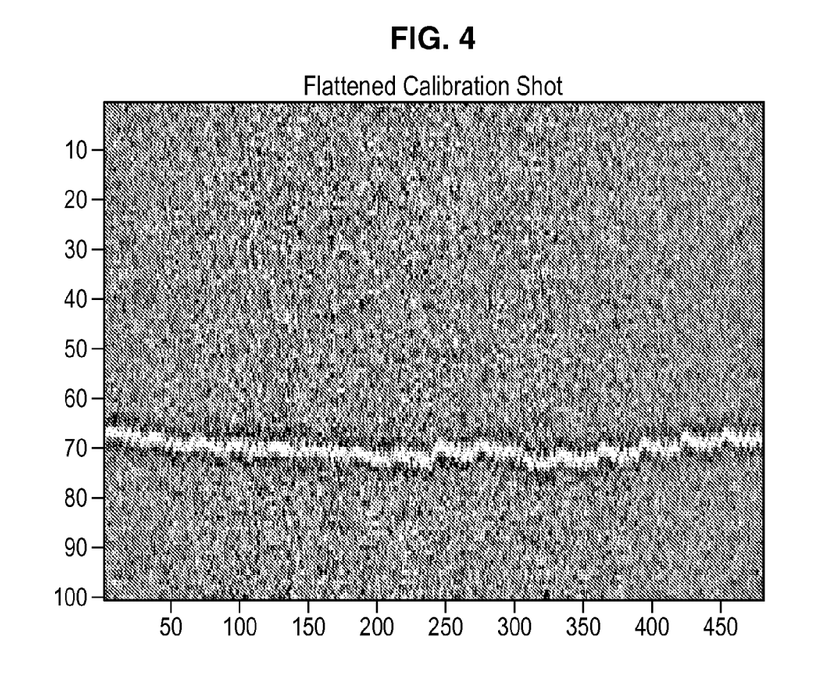
FIG. 4 represents schematically, the reference seismic data after correction of the estimated propagation time.

The determination of the RMS velocity makes it possible to correct the seismic data to compensate for the differences in wave travel time to reach the various receivers. The corrected data are reduced to a common reference, which is the perforation point (corrected data represented in FIG. 4).

According to a second sub-step 432, the processing unit 34 normalizes the amplitudes of the various traces to compensate for the differences in amplitudes between the traces, due to the differences in source-receiver distances.

The normalization sub-step 432 consists of dividing the amplitude of each trace by an RMS (Root Mean Square) amplitude, the RMS amplitude being defined as the root mean square of the amplitudes of the trace samples.

According to a third sub-step 433, the processing unit 34 filters the data to reduce the noise contained therein. The data filtering may include so-called "mute", F-K (Frequency-Wavenumber) filtered, F-X (Frequency-Trace number) filtering, median filtering or subtraction operations.

Figure 5:
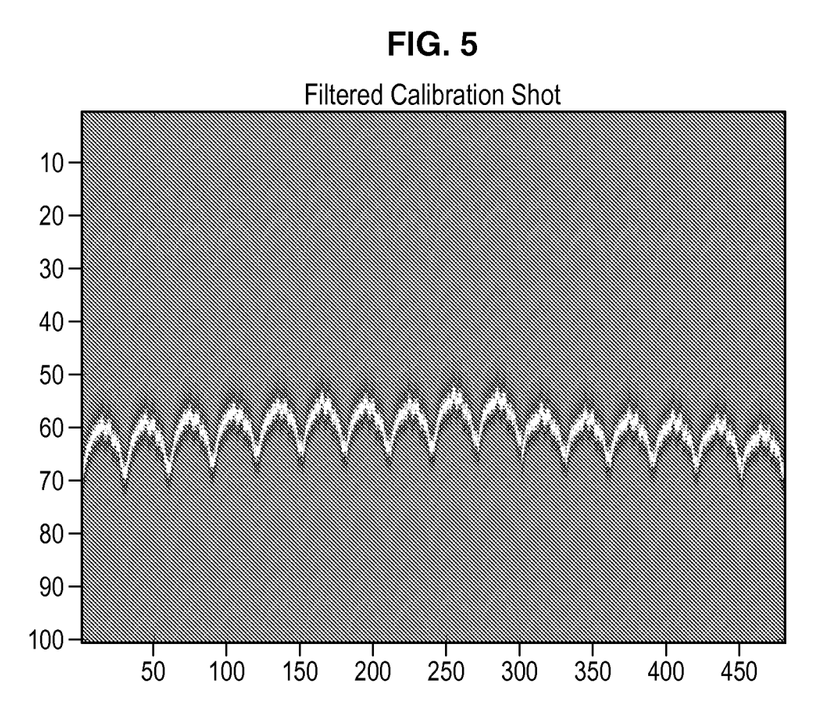
FIG. 5 represents schematically, the reference seismic data, after filtering.

According to a fourth step 44, the filtered reference seismic data (filtered data represented in FIG. 5) are stored in the memory of the processing means 34 in the form of a file referenced:

$$\text{Perfo}_0(t, Rc)$$

where t refers to the propagation time and Rc the receiver in question.

In some cases, records capable of providing reference data of sufficient quality are not available. In this case, it is possible to replace the first reference data recording and filtering phase by a reconstruction of these data by means of methods well-known in the field of seismic processing (DIX formula, ray tracing, finite difference model, etc.) which all assume knowledge of a propagation model consisting of propagation parameters (velocities, attenuations, static corrections) in the zone above the zone to be monitored.

The reference seismic data obtained by means of the first phase of the method will be used during the second subsequent real-time monitoring phase of the fracturing operation.

Figure 6:
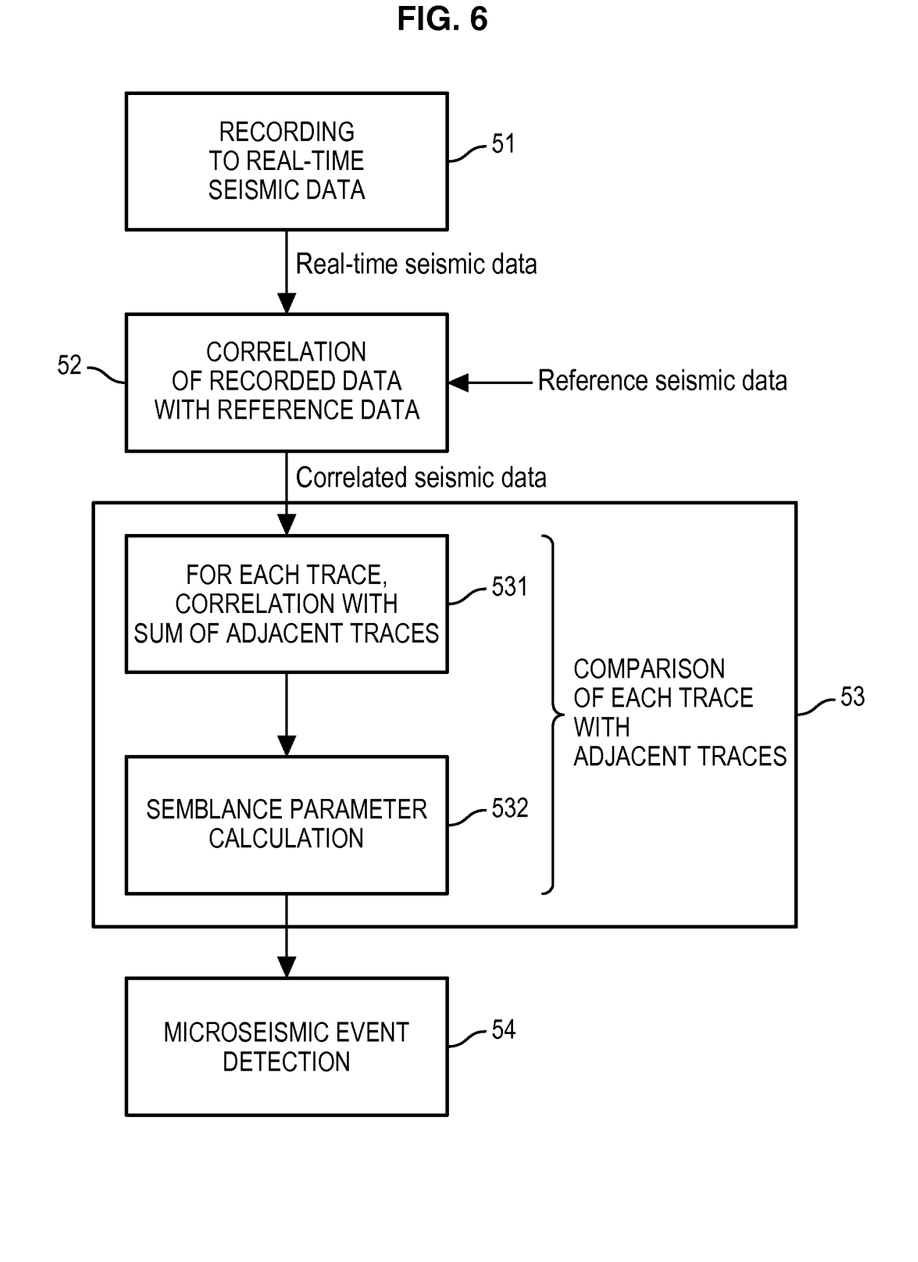
FIG. 6 represents schematically the steps of a second phase of the monitoring process, enabling detection of microseismic events.

FIG. 6 represents schematically the steps of the second phase of the monitoring process, enabling detection of microseismic events occurring during the fracturing operation, i.e. during the injection of fracturing fluid in the subsoil.

Figure 7:
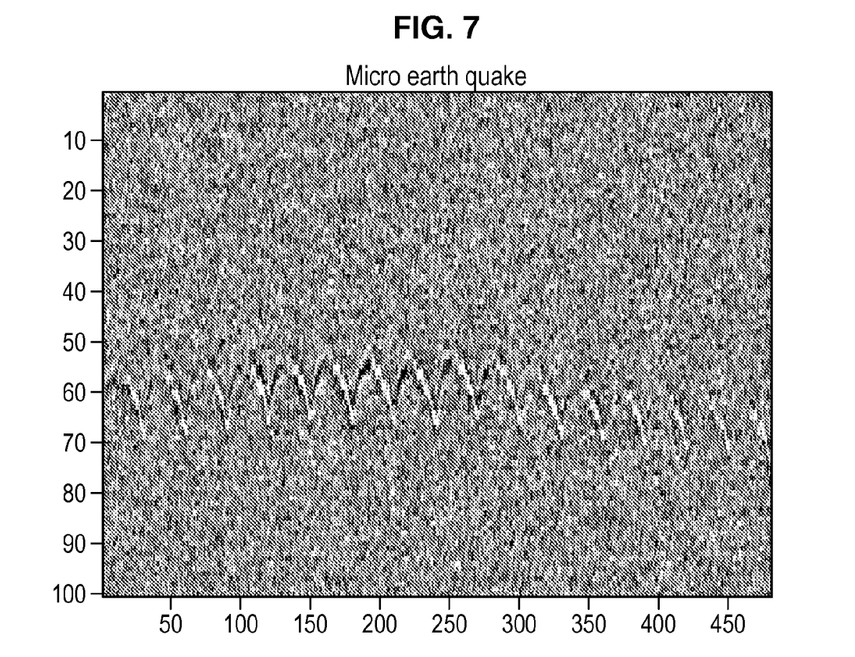
FIG. 7 represents schematically raw seismic data, as recorded during stimulated fracturing operations.

According to a first step 51, the receivers 33 convert the subsoil movement into electrical signals transmitted to the recording unit 32 to form the basic microseismic data file represented in FIG. 7 and referenced:

$$D(\theta, Rc)$$

where $\theta$ refers to the calendar time and Rc to the receiver in question.

According to a second step 52, the basic seismic data are correlated with the reference seismic data.

Figure 8:
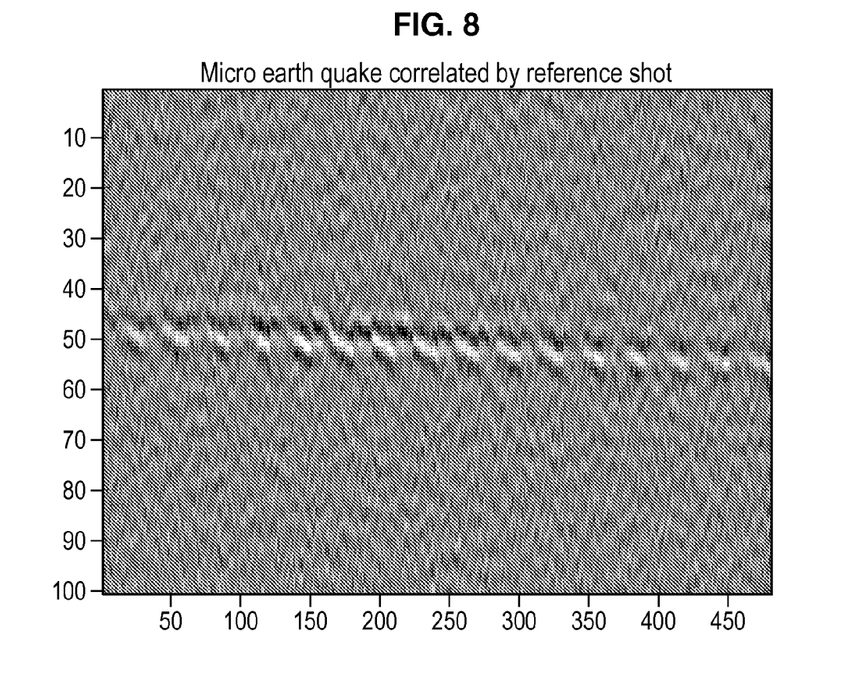
FIG. 8 represents schematically correlated data obtained by correlating recorded seismic data with the reference seismic data.

The correlated seismic data obtained (data represented in FIG. 8) are recorded in the form of a file referenced:

$$CC(\theta, Rc) = D(\theta, Rc) \otimes \mathrm{Perfo}_0(t, Rc)$$

where $\otimes$ refers to the correlation product.

The correlated seismic data are in the form of a wavelet signalling the possible presence of a microseismic event, said wavelet having the following properties:
- the arrival times corresponding to the maximum amplitudes (maximum energies) do not vary much from one receiver to adjacent receivers,
- the phase distortions created by the superficial layer WZ (Weathered Zone) are reduced or eliminated by the correlation operation,
- the polarity of the wavelet is spatially stable but may change according to the observation zone.

According to a third step 53, the similarity of each correlated trace with the adjacent correlated traces is evaluated. This third step 53 comprises several sub-steps 531 to 533.

According to a first sub-step 531, each seismic data trace $CC(\theta, Rc)$ is correlated with the sum of the traces contained in a vicinity of said trace.

$$C_0(\theta, Rc) = CC(\theta, Rc) \otimes S(\theta, Rc) \text{ where}$$

$$S(\theta, Rc) = \sum_{Rc \in V} CC(\theta, Rc)$$

where $S(\theta)$ is the sum of the traces contained in a vicinity V, the vicinity V being defined as a disk having a radius Rd centred on the trace in question.

Figure 9:
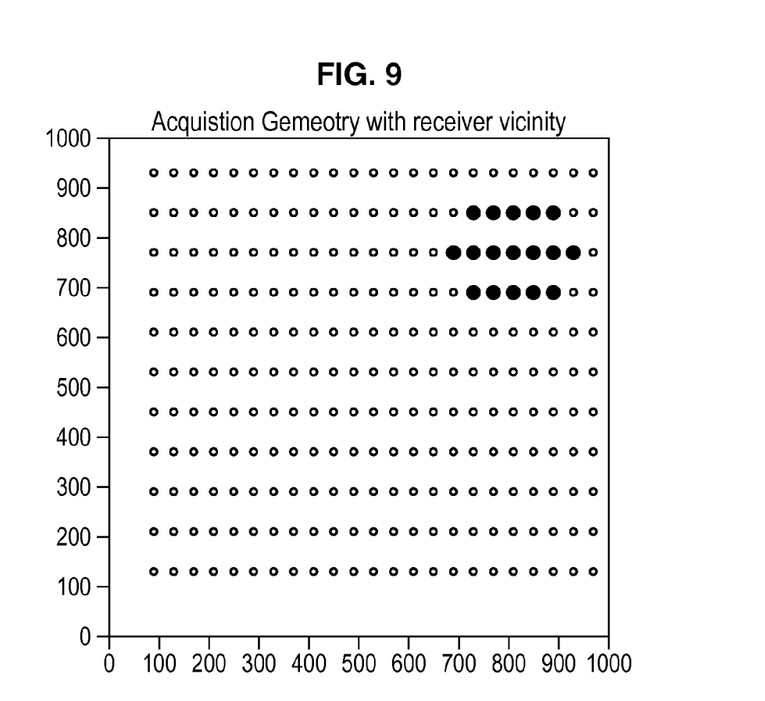
FIG. 9 represents schematically a recording device and a proximity zone determined about a given seismic trace.

FIG. 9 represents the distribution of the receivers about the well and a vicinity V having a radius Rd centred on the trace in question.

This correlation step makes it possible to compare each trace with the close environment thereof, by eliminating the polarity inversion problem between the traces. Indeed, the correlation operation demonstrates a similarity between the traces despite the presence of inverted polarity peaks (whereas a summing would result in the traces cancelling each other out). This step is performed in time windows. The best results are obtained when the windows fully overlap except for a single sample. For each correlation, it is only necessary to calculate a restricted number of points about the time 0, or even the single sample at the time 0.

According to a second sub-step 532, a semblance parameter $S_1(\theta)$ is calculated a sum of filtered seismic data $C_1(\theta, Rc)$:

$$S_1(\theta) = \sum_{Rc} C_1(\theta, Rc)$$

This sum may be a simple sum, a weighted sum (referred to as "diversity stack") or a median.

The semblance parameter $S_1(\theta)$ measures the overall similarity of the CC traces with the surrounding CC traces. After normalisation, this parameter is an indicator of the presence of a microseismic event.

Figure 10:
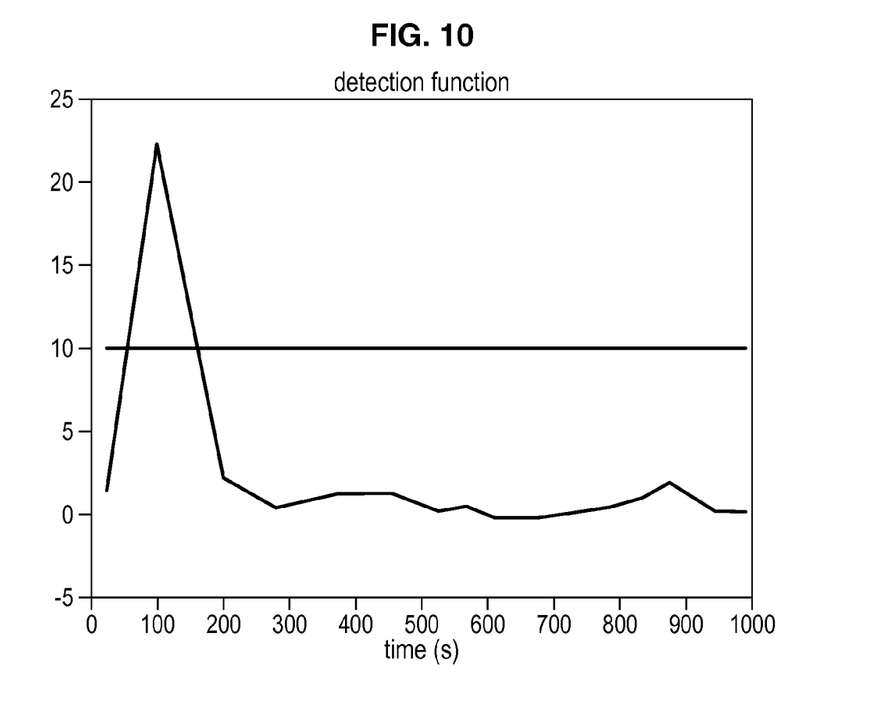
FIG. 10 is a diagram representing for each recorded trace, a trace similarity parameter with the traces recorded in the associated proximity zone.

FIG. 10 is a diagram representing the value of the semblance parameter $S_1(\theta)$ as a function of the calendar time $\theta$. In this diagram, the presence of a peak indicating the occurrence of a microseismic event in the time window in question is observed.

According to a fourth step 54, the processing unit 34 detects a microseismic event on the basis of the semblance parameter.

According to a first option, the processing unit 34 detects the occurrence of a microseismic event when a local peak of the semblance parameter is greater than a predefined threshold value (set to 10 in FIG. 10).

According to a second option, the processing unit 34 detects the occurrence of a microseismic event when the ratio between a local peak of the semblance parameter and the RMS amplitude of the corresponding sample is greater than a predefined threshold value.

According to a third option, the processing unit 34 detects the occurrence of a microseismic event when the ratio between a local peak of the semblance parameter and a mean value of the local peaks, an RMS value or a median of the local peaks is greater than a predefined threshold value.

According to a fourth option, the processing unit 34 performs a statistical search in the local peak curve. For example, the processing unit 34 searches for a discontinuity in an ordered sequence of peaks.

The monitoring method described, while it is of particular value for monitoring a stimulated operation, is not limited to this application and is applicable more generally for monitoring a subsoil zone.

The invention claimed is:

1. Method for monitoring a subsoil zone by means of a plurality of seismic receivers arranged on the surface or near said surface, comprising the following steps:
    generating a set of reference seismic data,
    recording seismic data characterizing a microseismic event with said receivers,
    correlating the recorded seismic data with the reference seismic data, resulting in a plurality of correlated traces,
    correlating each correlated trace associated with a given receiver with adjacent correlated traces associated with other receivers located in a vicinity of said given receiver, in order to evaluate a similarity of each correlated trace with the adjacent correlated traces, and
    detecting the microseismic event occurring in the subsoil zone by analysing said similarity.

2. Method according to claim 1, wherein the reference seismic data generation step comprises the following substeps:

activating an isotropic point source near the subsoil zone to be monitored, recording the data generated by said source, and filtering said data to obtain a set of reference data.

3. Method according to claim 2, wherein the filtering sub-step is broken down into the following sub-steps:

determining an RMS (Root Mean Square) velocity which maximises the sum of the traces contained in the reference data, normalizing the amplitudes of the different traces to compensate for the differences in amplitudes between traces due to differences in source-receiver distance, and filtering the normalized data to reduce noise contained therein.

4. Method according to claim 1, wherein the reference seismic data are obtained based on a propagation model in the deep and superficial layers.

5. Method according to claim 1, wherein the step of correlating each correlated trace associated with a given receiver comprises the following sub-steps:

for each correlated trace contained in the correlated seismic data, correlating (i) said correlated trace associated with the given receiver with (ii) sum of the correlated traces associated with the other receivers located in the vicinity of said given receiver, and calculating a semblance parameter as a sum of the correlated (i) and (ii) terms.

6. Method according to claim 5, wherein the correlation sub-step consists of a calculation of a sample at time 0.

7. Method according to claim 6, wherein the calculation of the correlation sample at the time 0 is obtained with the following sub-steps:

multiplying each correlated trace contained in the correlated seismic data by the sum of the correlated traces located in a vicinity of said correlated trace, and convoluting the result of this multiplication by a rectangular filter.

8. Method according to claim 5, wherein the microseismic event detection step includes a comparison of the semblance parameter with a threshold value.

9. Method according to claim 5, wherein the microseismic event detection step includes an analysis of the statistical distribution of the semblance parameter value.

10. The method according to claim 1, wherein said plurality of seismic receivers are not located in a well.

11. A device for monitoring a subsoil zone, comprising:

a plurality of seismic receivers arranged on the surface or in the vicinity of said surface, a recording unit which receives the signals transmitted by the receivers and writes same in a seismic data file, and seismic data processing means programmed to:

generate a set of reference seismic data, record seismic data characterizing a microseismic event with said receivers, correlate the recorded seismic data with the reference seismic data, resulting in a plurality of correlated traces, correlate each correlated trace associated with a given receiver with correlated traces associated with other receivers located in a vicinity of said given receiver, in order to evaluate a similarity of each correlated trace with adjacent correlated traces, and detect microseismic events occurring in the subsoil zone to be monitored.

12. The device according to claim 11, wherein said plurality of seismic receivers are not located in a well.

13. The device according to claim 11, wherein the seismic data processing means is programmed to:

activate an isotropic point source near the subsoil zone to be monitored, record the data generated by said source, and filter said data to obtain a set of reference data.

14. The device according to claim 13, wherein the filtering sub-step is broken down into the following sub-steps:

determining an RMS (Root Mean Square) velocity which maximizes the sum of the traces contained in the reference data, normalizing the amplitudes of the different traces to compensate for the differences in amplitudes between traces due to differences in source-receiver distance, and filtering the normalized data to reduce noise contained therein.

15. The device according to claim 11, wherein the reference seismic data are obtained based on a propagation model in deep and superficial layers.

16. Method for monitoring a fracturing operation in a well by means of a plurality of seismic receivers arranged about the well on the soil surface or near said surface, comprising the following steps:

generating a set of reference seismic data following a perforation shot in the well, recording the seismic data characterizing a microseismic event with said receivers, correlating the recorded seismic data the reference seismic data, resulting in a plurality of correlated traces, comparing each correlated trace associated with a given receiver with adjacent correlated traces associated with other receivers located in a vicinity of said given receiver, in order to evaluate a similarity of each correlated trace with the adjacent correlated traces, and detecting the microseismic event occurring in the subsoil zone by analysing said similarity.

17. The method according to claim 16, wherein said plurality of seismic receivers are not located in a well.

18. The method according to claim 16, wherein the reference seismic data are obtained based on a propagation model in deep and superficial layers.

19. The method according to claim 16, wherein the reference seismic data generation step comprises the following sub-steps:

activating an isotropic point source near the subsoil zone to be monitored, recording the data generated by said source, and filtering said data to obtain the set of reference data.

20. The method according to claim 19, wherein the filtering sub-step is broken down into the following sub-steps:

determining an RMS (Root Mean Square) velocity which maximises the sum of the traces contained in the reference data, normalizing the amplitudes of the different traces to compensate for the differences in amplitudes between traces due to differences in source-receiver distance, and filtering the normalized data to reduce noise contained therein.

* * * * *